(12) United States Patent
Kawakami et al.

(10) Patent No.: US 11,729,435 B2
(45) Date of Patent: *Aug. 15, 2023

(54) CONTENT DISTRIBUTION SERVER, CONTENT DISTRIBUTION METHOD AND CONTENT DISTRIBUTION PROGRAM

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,240

(22) Filed: Aug. 13, 2021

(65) Prior Publication Data

US 2021/0400319 A1 Dec. 23, 2021

Related U.S. Application Data

(63) Continuation of application No. 16/644,149, filed as application No. PCT/JP2018/031098 on Aug. 23, 2018, now Pat. No. 11,122,303.

(30) Foreign Application Priority Data

Sep. 4, 2017 (JP) .................................. 2017-169299

(51) Int. Cl.
*H04N 21/234* (2011.01)
*H04H 60/37* (2008.01)
(Continued)

(52) U.S. Cl.
CPC .... *H04N 21/23418* (2013.01); *H04H 60/375* (2013.01); *H04H 60/377* (2013.01);
(Continued)

(58) Field of Classification Search
CPC ......... H04N 21/23418; H04N 21/2187; H04N 21/23424; H04N 21/812; H04H 60/375; H04H 60/377; G06F 13/00
See application file for complete search history.

(56) References Cited

U.S. PATENT DOCUMENTS 11,122,303 B2    9/2021 Kawakami et al.
2003/0028873 A1  2/2003 Lemmons
(Continued)

FOREIGN PATENT DOCUMENTS

CN    102461161 A    5/2012
CN    104756505 A    7/2015
(Continued)

OTHER PUBLICATIONS

[English Translation] International Search Report and Written Opinion dated Oct. 2, 2018 for PCT Application No. PCT/JP2018/031098.
(Continued)

*Primary Examiner* — Anthony Bantamoi
(74) *Attorney, Agent, or Firm* — Dorsey & Whitney LLP

(57) ABSTRACT

A content distribution server, includes: a communicator that receives live contents transmitted through a network NW from a distributor terminal used by a distributor of a live content; a designator that designates an area in the live content, where another content is superimposed and played; a selector that selects the other content to be played in the area designated; and a controller that generates a distribution content by superimposing the other content selected by the selector in the area designated by the designator in the live content, wherein the communicator distributes the distribution content to a viewer terminal through the network NW.

15 Claims, 10 Drawing Sheets

(51) Int. Cl.
*H04N 21/2187* (2011.01)
*H04N 21/81* (2011.01)

(52) U.S. Cl.
CPC ... *H04N 21/2187* (2013.01); *H04N 21/23424* (2013.01); *H04N 21/812* (2013.01)

(56) References Cited

U.S. PATENT DOCUMENTS

| | | | |
|---|---|---|---|
| 2003/0228873 | A1* | 2/2003 | Lemmons ............... H04N 7/025 |
| 2007/0214476 | A1* | 9/2007 | Zalewski ............... H04N 7/025 |
| 2014/0253590 | A1 | 9/2014 | Needham et al. |
| 2017/0171335 | A1 | 6/2017 | Ao |
| 2017/0251261 | A1 | 8/2017 | James et al. |
| 2020/0382821 | A1 | 12/2020 | Kawakami et al. |

FOREIGN PATENT DOCUMENTS

| | | |
|---|---|---|
| CN | 104995663 A | 10/2015 |
| JP | 2003169311 A | 6/2003 |
| JP | 2004140584 A | 5/2004 |
| JP | 2005051703 A | 2/2005 |
| JP | 2007122113 A | 5/2007 |
| JP | 2007334734 A | 12/2007 |
| JP | 2009003446 A | 1/2009 |
| JP | 2009069407 A | 4/2009 |
| JP | 2011517231 A | 5/2011 |
| JP | 2016526813 A | 9/2016 |
| JP | 2017118559 A | 6/2017 |

OTHER PUBLICATIONS

[English Translation] First Office Action dated Jun. 24, 2021, for Chinese Application No. 201880055631.X, pp. all.
English translation of Decision to Grant a Patent for JP Application No. 2017 169299 dated Mar. 1, 2018, pp. all.
English translation of Notice of Reasons for Refusal for Application No. 2017-169299 dated Nov. 1, 2017, pp. all.
First Notice of Examination Opinion for Chinese Patent Application No. 202210264671.3 dated Apr. 27, 2023, pp. all.

* cited by examiner

US 11,729,435 B2

CONTENT DISTRIBUTION SERVER, CONTENT DISTRIBUTION METHOD AND CONTENT DISTRIBUTION PROGRAM

CROSS REFERENCE TO RELATED APPLICATION (S)

This application is a continuation of U.S. patent application Ser. No. 16/644,149, filed Mar. 3, 2020, which is a 371 National Stage application claiming priority to International Application No. PCT/JP2018/031098, filed Aug. 23, 2018, which claims priority to Japanese Patent Application No. 2017-169299, filed on Sep. 4, 2017. The aforementioned applications are incorporated herein by reference, in its entirety, for any purposes.

TECHNICAL FIELD

The present disclosure relates to a content distribution server, a content distribution method, and a content distribution program, each of which enables distribution of live content in a viewable manner.

BACKGROUND ART

Traditionally, there has been a technology to broadcast content, with another content such as an advertisement or the like superimposed to the content.

For example, Patent Document 1 discloses the following technology. Namely, a two-dimensional code contained in a video image received is obtained. Then, an area for displaying an advertisement is specified based on the two-dimensional code obtained. In this area specified, an advertisement corresponding to the two-dimensional code is combined. Then, a video having the advertisement combined therewith by a combiner is distributed.

In recent years, services that enable users in general to distribute live content created at home or the like through a network have become common.

CITATION LIST

Patent Documents

PATENT DOCUMENT 1: Japanese Patent Application Publication No. 2015-228585.

SUMMARY OF THE INVENTION

Technical Problem

There are cases where an increase in revenues from advertisements is sought for, by playing and distributing any other content such as an advertisement or the like in an open area of a video image distributed as live content.

However, the system of Patent Document 1 does not allow a distributor of the live content to select any given advertisement from a distributor terminal.

It is therefore an object of the present disclosure to provide a content distribution server, a content distribution method, and a content distribution program which enable playback of any other content in an arbitrary area of content distributed by a distributor.

Solution to the Problem

To solve the above problem, a content distribution server of the present disclosure includes: a communicator that receives live contents transmitted through a network from a distributor terminal used by a distributor of a live content; a designator that designates, according to an instruction from the distributor terminal, an area within a video image of the live content received, the area being a space in the live content, where another content is superimposed and played; a selector that selects the other content to be played in the area designated; a controller that generates a distribution content by superimposing the other content selected by the selector in the area designated by the designator in the live content, wherein the communicator distributes the distribution content to a viewer terminal through the network.

Further, a content distribution method of the present disclosure includes the steps of: receiving a live content transmitted through a network from a distributor terminal used by a distributor of a live content by a communicator; designating by a designator, according to an instruction from the distributor terminal, an area within a video image of the live content received, the area being a space in the live content, where another content is superimposed and played; selecting the other content to be played in the area designated by a selector; generating the distribution content by a controller, by superimposing the other content selected by the selector in the area designated by the designator in the live content; and distributing the distribution content to a viewer terminal through the network by the communicator.

Further, a content distribution program of the present disclosure implements, in a computer, the steps of: receiving live contents transmitted through a network from a distributor terminal used by a distributor of a live content; designating according to an instruction from the distributor terminal, an area within a video image of the live content received, the area being a space in the live content, where another content is superimposed and played; selecting the other content to be played in the area designated; generating a distribution content by superimposing the other content selected in the area designated in the live content; and distributing the distribution content to a viewer terminal through a network.

Effects of the Invention

The content distribution server, the content distribution method, and the content distribution program as described hereinabove enable playback of any other content in an arbitrary area of a content distributed by a distributor.

DESCRIPTION OF EMBODIMENTS

The following describes embodiments. It should be noted that the embodiments described below do not unduly limit the claims of the present disclosure. Further, not all configurations of the embodiments described herein are essential in the present disclosure.

First Embodiment

The following describes a first embodiment of the present disclosure, which is a content distribution system 1 that distributes live content in such a manner that advertisement content is superimposed and displayed within a distributor-designated area of the live content.

Configuration

Figure 1:
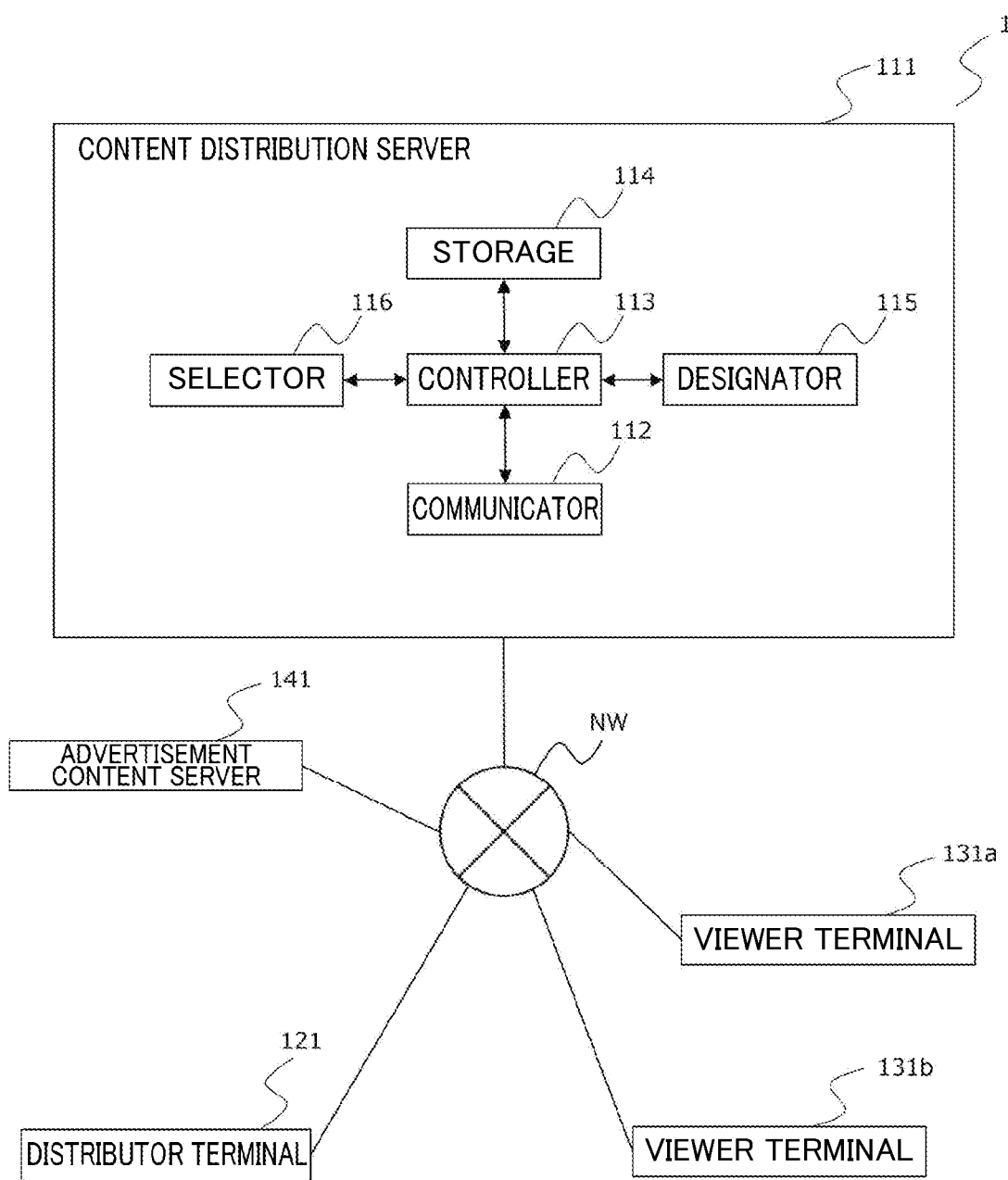
FIG. 1 is a schematic block diagram showing a configuration of a content distribution system 1 of an embodiment of the present disclosure.

First, with reference to FIG. 1, the following describes a configuration of a content distribution system 1 of the present embodiment, including a content distribution server 111 for distributing live content intended to be distributed by a distributor. The live content herein is so-called live broadcast content, such as a moving image or a sound, which allows a viewer to view in real time the content intended to be distributed by the distributor.

As shown in FIG. 1, the content distribution system 1 of the present embodiment is configured such that the content distribution server 111, a distributor terminal 121, viewer terminals 131a, 131b, and an advertisement content server 141 are connectable to a network NW such as the internet.

The content distribution server 111 is a server apparatus that distributes live content transmitted from the distributor terminal 121 to the viewer terminals 131a, 131b. The content distribution server 111 includes a communicator 112, a controller 113, a storage 114, a designator 115, and a selector 116.

The communicator 112 serves as a communication interface that performs communication with the distributor terminal 121, the viewer terminals 131a, 131b, and the advertisement content server 141 through the network NW. The communicator 112 receives live content transmitted from the distributor terminal 121 and superimpose content (another content) transmitted from the advertisement content server 141. Further, the communicator 112 distributes, to the viewer terminals 131a, 131b, distribution content generated by the controller 113 which is hereinafter described. Further, the communicator 112 may transmit/receive, as needed, login ID information of a distributor or a viewer to log in the content distribution server 111 via the distributor terminal 121 or the viewer terminals 131a, 131b.

The controller 113 generates a superimpose content list in which sets of superimpose content stored in the later-described storage 114 or in the later-described advertisement content server 141 are listed for the distributor to choose. The controller 113 further generates the distribution content in which the superimpose content is superimposed to the live content. At a time of generating the distribution content, the controller 113 superimposes the superimpose content to the live content based on display area information and allotment information stored in the later-described storage 114.

The storage 114 stores display area information for the superimpose content, which is designated by the later-described designator 115. Further, the storage 114 stores the allotment information of the superimpose content selected by the later-described selector 116. Further, the storage 114 stores the superimpose content created by an administrator of the content distribution server, a distributor or the like. Further, the storage 114 temporarily stores superimpose content related to an advertisement transmitted from the advertisement content server 141. Further, the storage 114 stores the superimpose content list generated by the controller 113. Further, the storage 114 stores the superimpose content list regarding distributable superimpose content. The superimpose content list contains information of an original sender of the superimpose content and a consideration information regarding distribution of the superimpose content. The consideration information is, for example, information such as "JPY 5,000 is paid to the distributor, for displaying the advertisement in an area taking up 10% of the video image in the distributed live content for 30 minutes."

The designator 115 designates an area of the live content in which the superimpose content is superimposed and displayed, in response to an operation of the distributor terminal 121. The area designated is stored as display area information in the storage 114. The method of designating an area may be as follows. Namely, a constant area of a fixed position within a video image may be designated. Alternatively, it is possible to catch a human face and a position and an area relative to a face-caught area may be designated. Further, a shape of a cup or the like may be recognized, and an area which is a part of the cup may be designated. The number of areas designated within a video image may be one position or more than one position.

In response to an operation of the distributor terminal 121, the selector 116 selects the superimpose content from the superimpose content list and allots the superimpose content to an area designated by the designator 115. The designator 115 stores the allotment of the superimpose content as the allotment information in the storage 114.

Next, the following describes a configuration and operation of the distributor terminal 121. The distributor terminal 121 is a terminal device used by the content distributor, and is an information processing device such as a smartphone, a mobile phone, a personal handy phone system (PHS), a personal computer, a gaming device, a personal digital assistant (PDA), a portable gaming console, a watch, a smartwatch, a head-mounted display, a wearable display, an image generation device, and the like. Further, the distributor terminal 121 is connectable to the content distribution server 111 through the internet (WAN), a network NW such as LAN, or the like. Note that the communication channel between the distributor terminal 121 and the content distribution server 111 may be wired or wireless. The distributor creates live content for broadcasting on live by using the distributor terminal 121. The distributor terminal 121 transmits in real time the created live content to the content distribution server 111.

Next, the following describes a configuration and operation of the viewer terminals 131a, 131b. Each of the viewer terminals 131a, 131b is a terminal device used by a viewer, and is an information processing device such as a smartphone, a mobile phone, a personal handy phone system (PHS), a personal computer, a gaming device, a personal digital assistant (PDA), a portable gaming console, a watch, a smartwatch, a head-mounted display, a wearable display, an image generation device, and the like. Further, the viewer terminals 131a, 131b are each connectable to the content distribution server 111 through the internet (WAN), a network NW such as LAN, or the like. Note that the communication channel among the viewer terminals 131a, 131b and the content distribution server 111 may be wired or wireless.

The distributor terminal 121 and the viewer terminals 131a, 131b may access the content distribution server 111 through exclusive application software installed. Further, the distributor terminal 121 and the viewer terminals 131a, 131b may access the content distribution server 111 by using an operation environment (an Application Programming Interface (API), a platform, and the like) provided by the content distribution server 111 or by another server.

The advertisement content server 141 stores superimpose content uploaded to the advertisement content server 141 by an advertisement requester. Further, the advertisement content server 141 also serves as a server apparatus that performs transmission to the content distribution server 111. For example, the advertisement content server 141 stores advertisement content such as a corporate advertisement. The distributor is able to select, from the distributor terminal 121, which content in the advertisement content server 141 is to be used as the superimpose content from the superimpose content list. The distributor may receive a consideration from a content provider, according to the period of using, as advertisement content, the superimpose content in the advertisement content server 141 and size of displaying the superimpose content.

Video of Content

Figure 2:
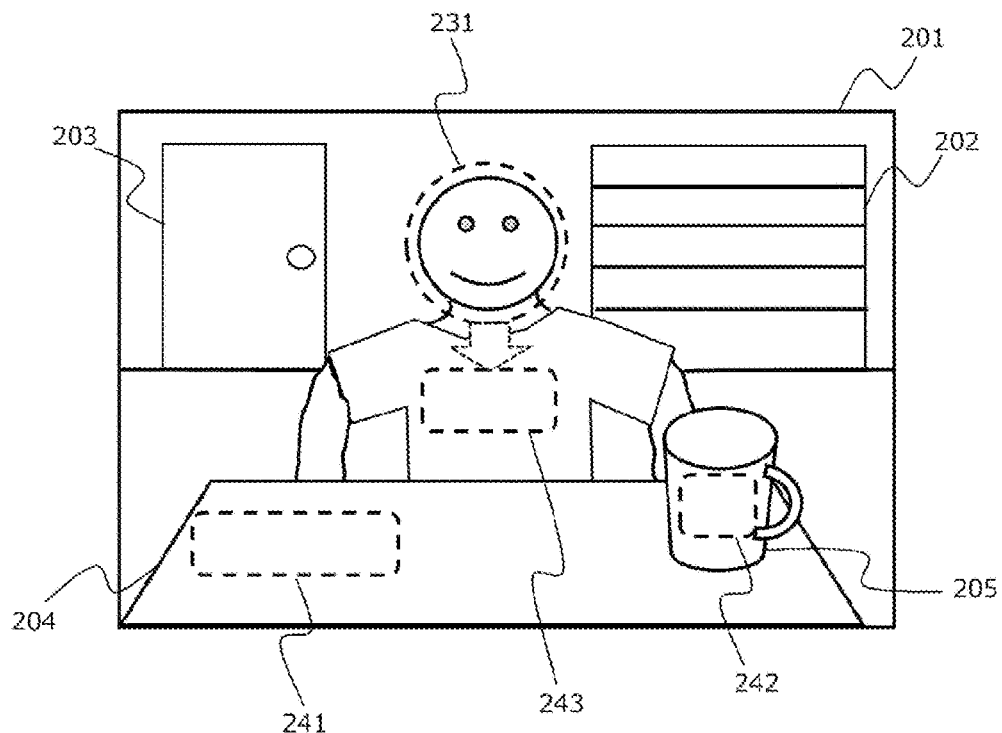
FIG. 2 is a diagram showing a video image of a shooting site of live content of a first embodiment.
Figure 3:
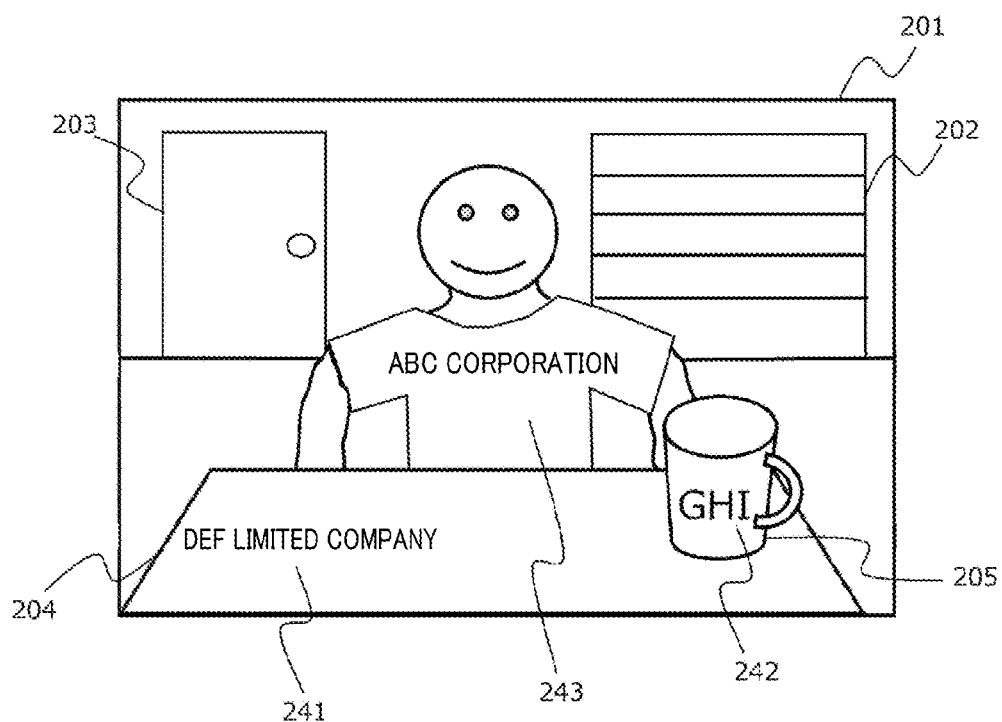
FIG. 3 is a diagram showing a distributed video image of the live content of the first embodiment.
Figure 4:
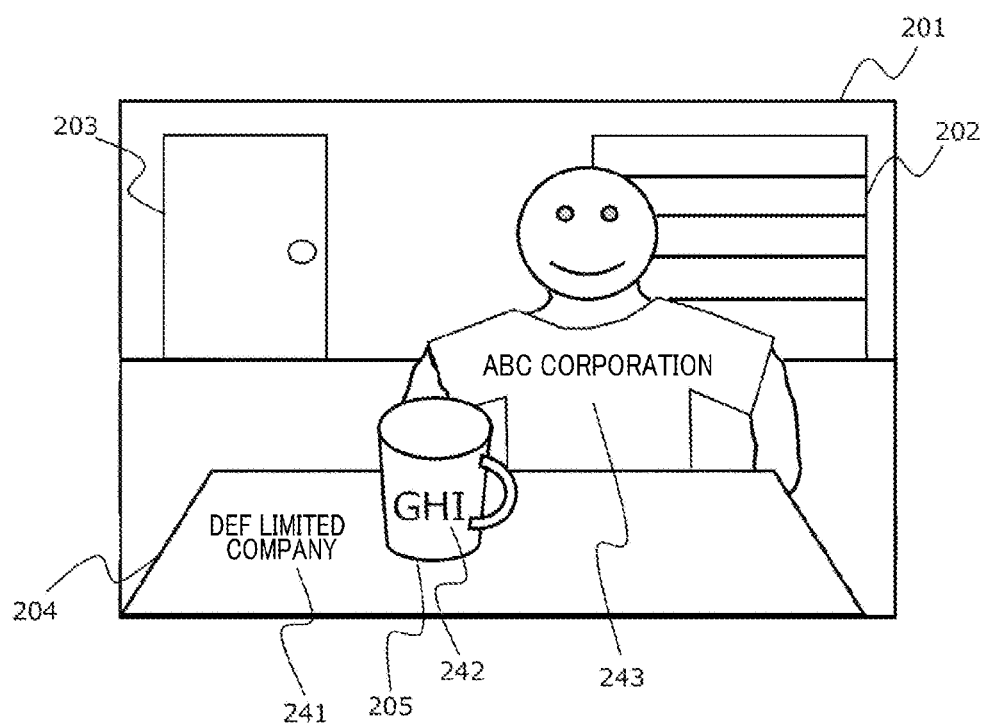
FIG. 4 is a diagram showing a distributed video image of the live content of the first embodiment.

With reference to FIGS. 2 to 4, the following describes a video of a shooting site of live content transmitted from the distributor terminal 121 and a video of distribution content distributed from the content distribution server 111, of the first embodiment of the present disclosure.

FIG. 2 is a diagram showing a video image of a shooting site of the live content. The shooting site is a room, a living room, or the like of the home of the distributor. The room 201 includes furniture 202, a door 203, and a desk 204. FIG. 2 shows a video image of the inside of the room, which is taken by a web camera installed to the distributor terminal 121 such as a personal computer placed on the desk. The distributor is seated, facing towards the distributor terminal 121. Further, a cup 205 is placed on the desk.

The distributor is able to designate an area of the video image, where the advertisement content is to be placed, while watching the video image captured by the web camera on the distributor terminal 121. An open space on the desk is designated as a designated area A 241. The surface of the cup 205 is designated as a designated area B 242. The cup 205 is shape-recognized, by registering the cup 205 to the content distribution server 111 by using the distributor terminal 121. Therefore, when the cup 205 moves, the designated area. B 242 which is the surface of the cup 205 also moves along with the cup 205 in the video image. Next, a part of the T-shirt that the distributor wears is a designated area C 243. The designated area C is an area designated based on a relative relationship with the position of the face 231 of the distributor. The content distribution server 111 performs face-catch to recognize the face 231 of the distributor. The distributor designates, from the distributor terminal 121, an area having a width of 250 mm and a height of 100 mm as a designated area C, at a position 300 mm below from the center of the face-caught face 231. It is possible to designate, as the designated area C, an area whose position relative to the center of the face 231 is zero, that is, the face 231. The designator 115 of the content distribution server 111 stores the designated area A 241, the designated area B 242, and the designated area C 243 as display area information in the storage 114.

FIG. 3 is a diagram showing a video image of the distribution content. The distribution content is a video image distributed from the content distribution server 111 to the viewer terminals 131a, 131b, and is also displayed on the distributor terminal 121 as a confirmation video image. The distributor selects and determines, through the distributor terminal 121, the content he/she wishes from the superimpose content list transmitted from the content distribution server 111. In FIG. 3, the superimpose content of text reading "DEF Limited Company" is displayed in the designated area A 241. Another superimpose content of text reading "GHI" is displayed in the designated area B 242. Further, yet another superimpose content of text reading "ABC Corporation" is displayed in the designated area C 243. The distributor is able to determine, on the distributor terminal 121, which superimpose content is allotted to which designated area. For each designated area, the selector 116 of the content distribution server 111 stores, in the storage 114, the allotment information indicative of which superimpose content is allotted. The controller 113 generates distribution content by superimposing the superimpose content to the live content, based on the display area information and the allotment information.

FIG. 4 is a diagram showing a video image of the distribution content, in which the positions of the distributor and the cup 205 have moved from their positions shown in FIG. 3. For the designated area B 242, the cup 205 is shape-recognized and text reading "GHI" is displayed on the surface thereof. Therefore, when the cup 205 moves, the displayed text of "GHI" also moves along with the cup 205. Further, the designated area 243 is determined as a position relative to the face 231 of the distributor. Therefore, when the distributor moves, the text of "ABC Corporation" also moves along with the distributor. Further, the designator 115 shape-recognizes the cup 205. Therefore, the position of the displayed text may be rotated, when the cup 205 rotates. The designator 115 may recognize the position of the holding hand by means of shape-recognition, and may change the display position based on calculation of a relation between the position of the hand and the display position. Similarly, the designator 115 may shape-recognize the T-shirt, and change the shape of text and a design displayed, according to the wrinkle on the surface of the T-shirt. This way, the superimpose content is displayed to the viewer as if it is actually printed on the cup 205 or the T-shirt.

Process Flow

Figure 5:
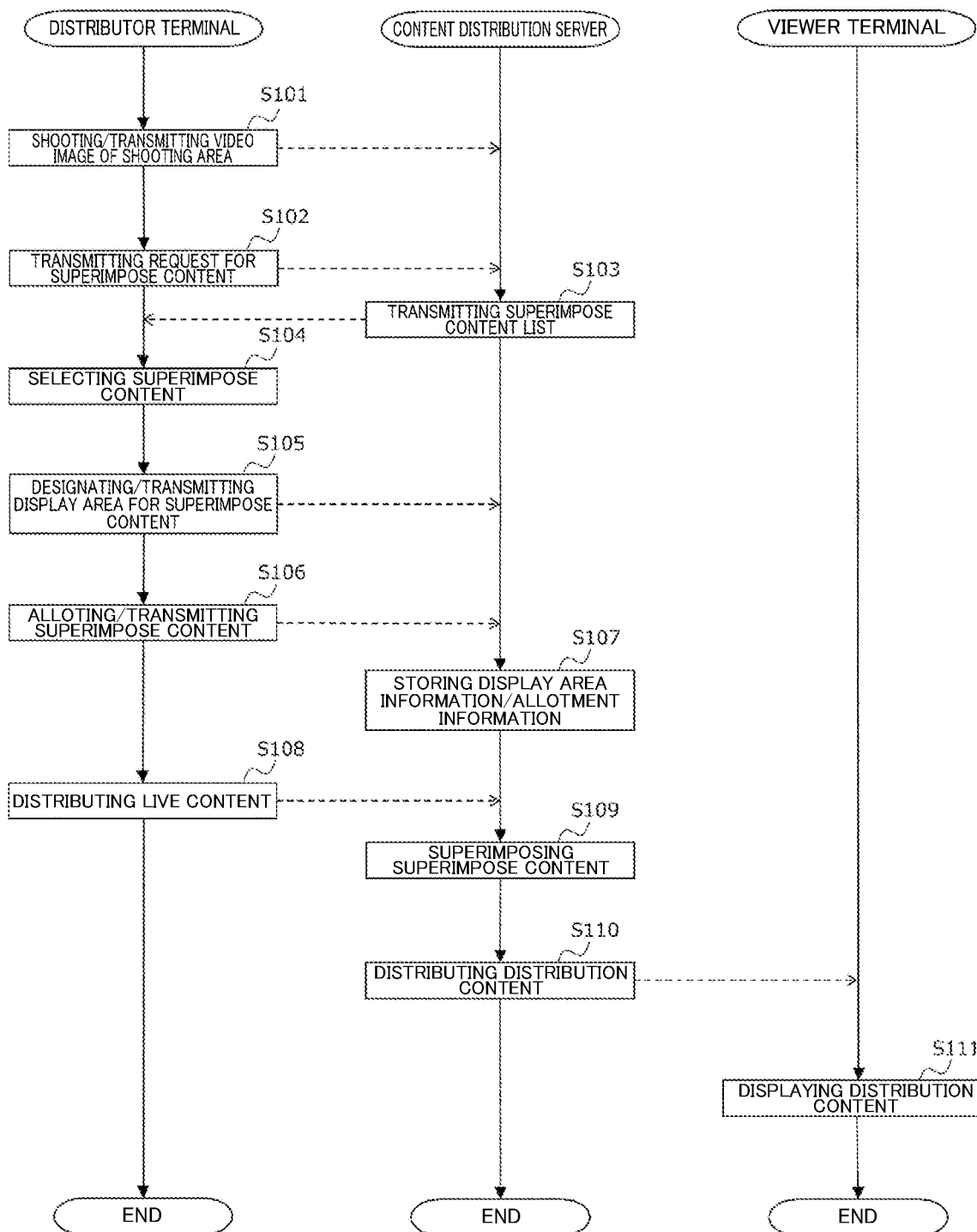
FIG. 5 is a flowchart explaining an operation of the content distribution system 1 of the first embodiment.

Next, with reference to the flowchart of FIG. 5, the following describes, operation of the content distribution system 1 of the first embodiment of the present disclosure. The flowchart of FIG. 5 shows how operations of the content distribution server 111, the distributor terminal 121, and the viewer terminal 131a are related to one another.

In step S101, the distributor shoots a video of the shooting site. The distributor further transmits, from the distributor terminal 121, the video of the shooting site captured by the distributor terminal 121 to the content distribution server 111.

In step S102, the distributor transmits a request signal for distributable superimpose content, from the distributor terminal 121 to the content distribution server 111.

In step S103, the content distribution server 111 transmits the distributable superimpose content list to the distributor terminal 121, based on the request signal having been transmitted in step S102. The superimpose content list may be stored in the storage 114 or stored in the advertisement content server 141 and transmitted through the content distribution server.

In step S104, the distributor selects which superimpose content he/she wishes to distribute from the superimpose content list having been transmitted in step S103, by using the distributor terminal 121.

In step S105, the distributor designates a display area for the superimpose content through the distributor terminal 121 (corresponding to FIG. 2). The distributor terminal 121 transmits the display area designated to the content distribution server 111. The designator 115 stores the display area having been transmitted in the storage 114 as the display area information.

In step S106, the distributor allots the superimpose content selected in step S104 to the area designated in step S105, by using the distributor terminal 121. The information of the superimpose content allotted is transmitted to the content distribution server 111.

In step S107, the storage 114 stores therein the display area information having been transmitted in step S105. The storage 114 also stores therein the allotment information having been transmitted in step S106.

In step S108, the distributor performs video-shooting for the live content using the distributor terminal 121. The distributor terminal 121 transmits the video of the live content captured to the content distribution server 111.

In step S109, the controller 113 generates distribution content (corresponding to FIGS. 3 and 4) in which the superimpose content is superimposed to the live content having been transmitted in step S108, according to the display area information and the allotment information stored in the storage 114.

The designator 115 determines an area to display the superimpose content in the video image of the live content, based on the display area information. For example, the designator 115 determines the designated area B 242 based on the display area information such that the designated area B 242 corresponds to the surface of the cup 205. The designated area B 242 is determined through the shape-recognition of the cup 205. Therefore, when the cup 205 moves, the designated area B 242 moves along with the cup 205. The selector 116 allots the superimpose content to each of the designated areas (designated area A 241 to designated area C 243), based on the allotment information. For example, the selector 116 allots the superimpose content of text reading "GHI" to designated area B 242. Thus, when the cup 205 moves, the superimpose content of the text reading "GHI" also moves along with the cup 205 (corresponding to FIG. 4).

In step S110, the communicator 112 distributes the distribution content generated to the viewer terminal 131a.

In step S111, the viewer terminal 131a displays the distribution content distributed in step S110. Thus, the viewer terminal 131a is able to display the live content in which the superimpose content is superimposed to the video image thereof.

Description of Effects

As described above, the content distribution system 1 of the first embodiment of the present disclosure enables superimposition and playback of any superimpose content to any live content to be distributed by the distributor. This allows an open area in the video image of live content to be used for an advertisement. As a consideration of displaying the advertisement, an advertisement revenue may be earned.

The superimpose content is not limited to text information but may also be information in the form of images and videos.

Further, the superimpose content displayed in each designated area may be switched according to the distribution time of the live content. For example, text of "GHI" may be displayed as the superimpose content in the designated area B 242 from the start of distributing the distribution content until elapse of 30 minutes, and then the superimpose content may be switched to text of "JKL" upon elapse of 30 minutes. The distributor is able to set, in advance, the time to switch the superimpose content and to which superimpose content the switching takes place, as the allotment information, on the distributor terminal 121.

Further, the superimpose content displayed in each designated area may be switched by distributor operation on the distributor terminal 121. For example, the superimpose content displayed in the designated area B 242 may be the text of "GHI" at the beginning of the distribution content. Then, in response to reception of a selection instruction signal from the distributor terminal 121, the controller 113 may switch the superimpose content so that the text of "JKL" is displayed. The distributor may set, as the allotment information, the superimpose content to be switched in advance from the distributor terminal 121.

Further, the superimpose content displayed in the designated area may be switched according to an instruction of an original sender of the superimpose content. For example, an advertisement requester who is the original sender of the superimpose content may operate a terminal device (not shown) used by the advertisement requester to switch the superimpose content to be displayed. The superimpose content displayed in the designated area B 242 may be the text of "GHI" at the beginning of the distribution content. Then, in response to reception of a selection instruction signal from the terminal device used by the advertisement requester, the controller 113 may switch the superimpose content so that the text of "JKL" is displayed.

Further, at a time of switching the superimpose content, the controller 113 may cause the superimpose content before switching to fade out, and causes the superimpose content after switching to fade in. The form of switching may be cross-fading. Alternatively, morphing may be adopted far displaying the superimpose content before and after the switching. This prevents the viewer from feeling the unnaturalness in switching the superimpose content.

Further, the superimpose content may be different sets of content depending on the terminal devices. For example, as the superimpose content to be displayed in the designated area B 242, the terminal device 131a may display "GHI" as the superimpose content, while the terminal device 131b displays "JKL" as the superimpose content. The controller 113 is capable of analyzing preferences of viewers based on their login ID information through their terminal devices. The controller 113 generates sets of distribution content, each of which has a set of superimpose content superimposed according to the preference of each viewer. The communicator 112 then transmits these sets of distribution content thus generated to the viewer terminals 131*a*, 131*b*, respectively. It should be noted that the controller 113 may analyze the preference of each viewer based on cookie information (HTTP cookie) from the viewer terminal, instead of using the login information.

Further, the original sender of the superimpose content may request the superimpose content created by the original sender be displayed, while the distribution content is viewed. A specific process of this is as follows. Namely, the advertisement requester who is the original sender of the superimpose content may operate the terminal device (not shown) used by the advertisement requester to transmit to the content distribution server 111 a request signal requesting displaying of the superimpose content created by the advertisement requester in the currently distributed distribution content. Further, the advertisement requester uploads, to the content distribution server 111, the superimpose content he/she wishes to display. Further, the advertisement requester selects a display area to display the superimpose content, within the video image of the distribution content. Then, the content distribution server 111 determines an amount of consideration for displaying the advertisement, which is indicated by the request signal. The content distribution server 111 may determine the amount of consideration based on comparison with the amount set by the distributor. Further, the amount of consideration may be compared with amounts offered by others who wish displaying of their advertisements in the same display area. When the amount of consideration satisfies a condition, the request will be accepted. Then, the content distribution server 111 is able to switch over and display the superimpose content created by the advertisement requester in real time, upon request from the advertisement requester, in place of the other superimpose content having been displayed.

Second Embodiment

The following describes a second embodiment of the present disclosure, which is a content distribution system 1 that superimposes and displays another content in a background of a shooting site. The content distribution system 1 of the first embodiment is used to describe the second embodiment.

Video Image of Live Content

Figure 6:
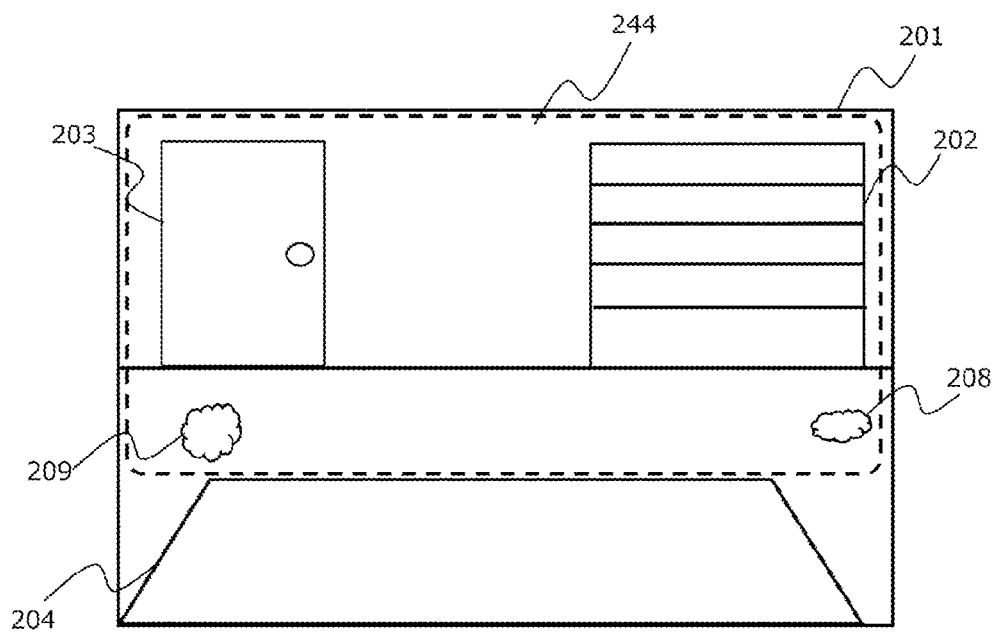
FIG. 6 is a diagram showing a video image of a shooting site of live content of a second embodiment.
Figure 7:
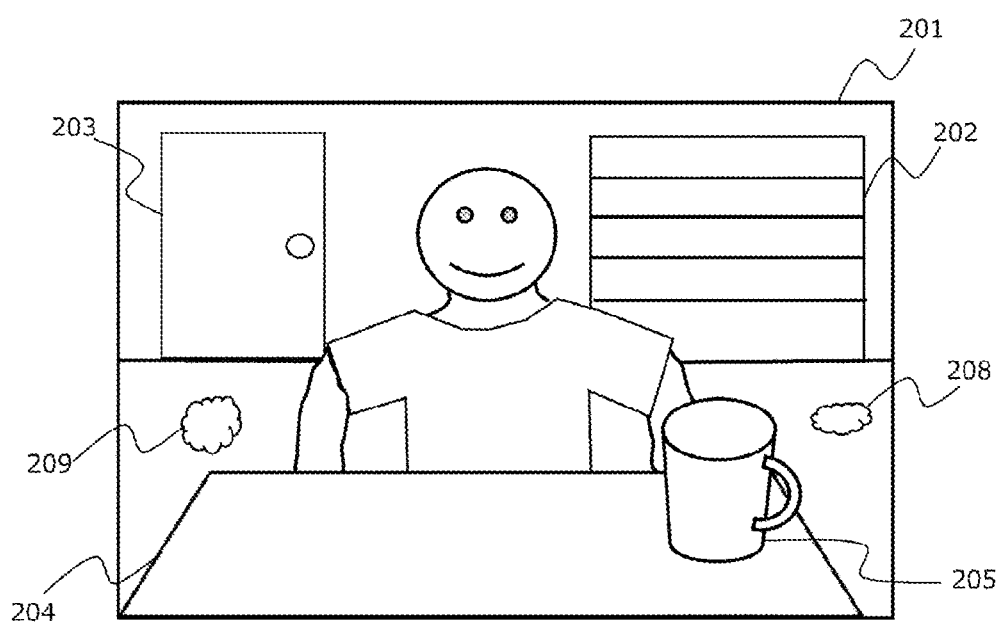
FIG. 7 is a diagram showing a video image of a shooting site of live content of the second embodiment.
Figure 8:
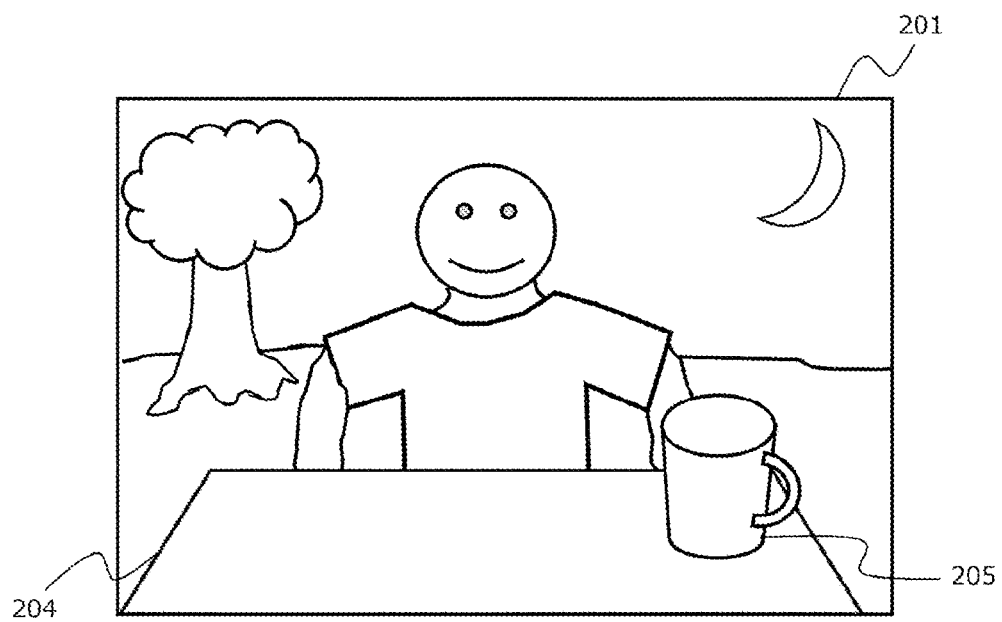
FIG. 8 is a diagram showing a distributed video image of the live content of the second embodiment.

With reference to FIGS. 6 to 8, the following describes a video image of a shooting site of live content transmitted from the distributor terminal 121 and a video image of distribution content distributed from the content distribution server 111, in relation to the second embodiment of the present disclosure.

FIG. 6 is a diagram showing a video image of a shooting site of the live content. The shooting site is a room, a living room, or the like of the home of the distributor. The room 201 includes furniture 202, a door 203, and a desk 204. Further, pieces of rubbish 208, 209 are scattered on the floor of the room 201. Further, FIG. 6 shows a state in which the distributor and items that the distributor may bring in during distribution of live content are not shown. The distributor transmits the video image as shown in FIG. 6, from the distributor terminal 121 to the content distribution server 121.

FIG. 7 is a diagram showing a video image of a shooting site, with the distributor of the live content. Further, the cup 205 the distributor of the live content has been brought in during the distribution is displayed.

FIG. 8 is a diagram showing a video image of the distribution content. The distribution content is a video distributed from the content distribution server 111 to the viewer terminals 131*a*, 131*b*, and is also displayed on the distributor terminal 121 as a confirmation video. The distribution content is a content generated from the live content with another content superimposed thereon. The other content is the superimpose content, or content including a video, an image, and the like with an object, a view, a design etc. FIG. 8 shows a state where a video of a landscape such as a tree and the moon is displayed as the other content.

Process Flow

Figure 9:
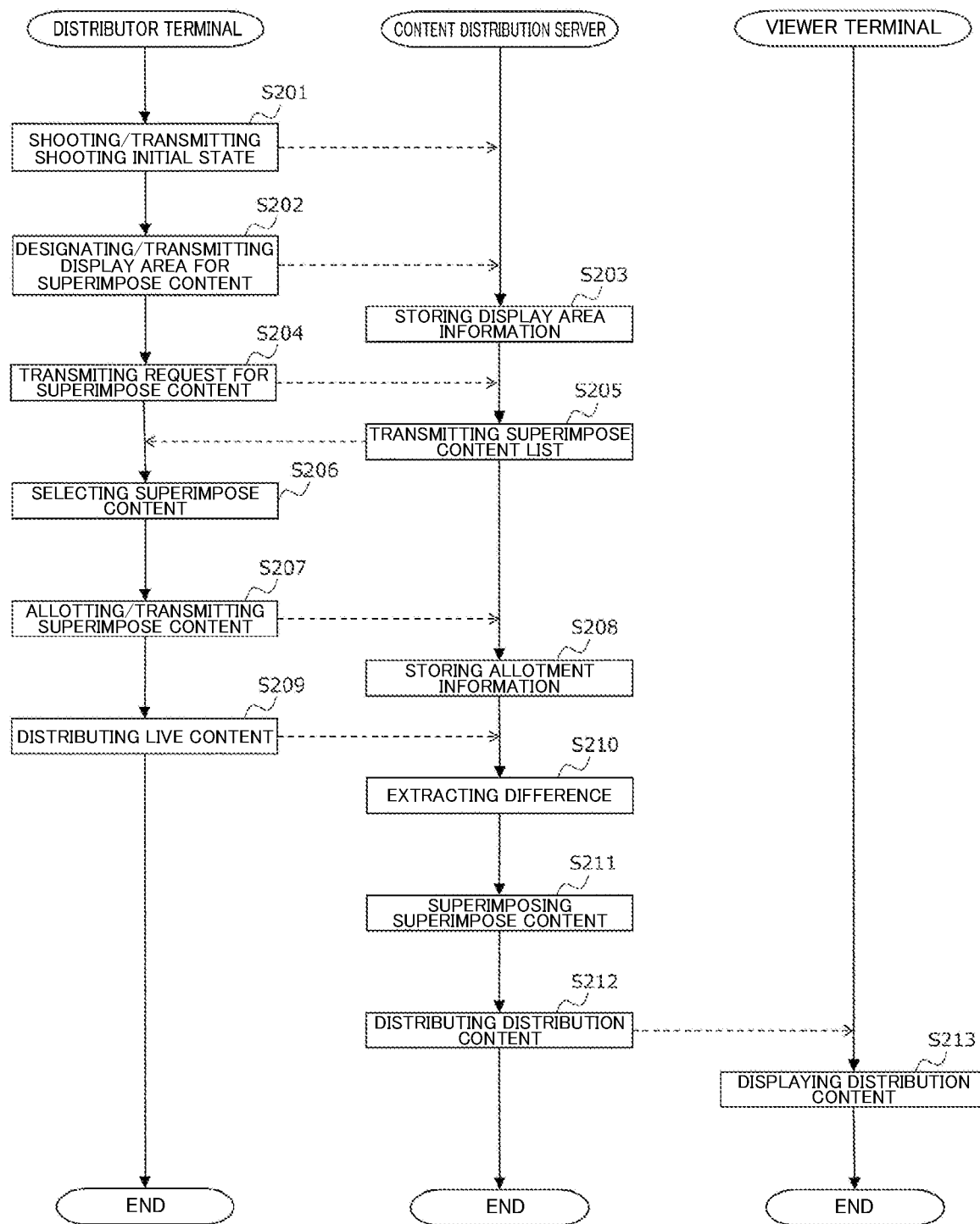
FIG. 9 is a flowchart explaining an operation of the content distribution system 1 of the second embodiment.

Next, with reference to the flowchart of FIG. 9, the following describes, operation of the content distribution system 1 of the second embodiment of the present disclosure. The flowchart of FIG. 9 shows how operations of the content distribution server 111, the distributor terminal 121, and the viewer terminal 131*a* are related to one another.

In step S201, the distributor shoots a video of the shooting site in an initial state. The distributor further transmits, from the distributor terminal 121, the video of the shooting site in the initial state captured by the distributor terminal 121 to the content distribution server 111. The video of the shooting site in the initial state means, for example, a video without the distributor him/herself, cup, and the like which will appear during distribution of the live content (corresponding to FIG. 6).

In step S202, the distributor designates a display area for the superimpose content through the distributor terminal 121 (corresponding to the designated area 244 of FIG. 6). The distributor terminal 121 transmits the display area designated to the content distribution server 111.

In step S203, the designator 115 stores the display area having been transmitted in the storage 114 as the display area information.

In step S204, the distributor transmits a request signal for distributable superimpose content, from the distributor terminal 121 to the content distribution server 111.

In step S205, the content distribution server 111 transmits the distributable superimpose content list to the distributor terminal 121, based on the request signal having been transmitted in step S204. The superimpose content list may be stored in the storage 114 or stored in the advertisement content server 141 and transmitted through the content distribution server.

In step S206, the distributor selects which superimpose content he/she wishes to distribute from the superimpose content list having been transmitted in step S103, by using the distributor terminal 121.

In step S207, the distributor allots the superimpose content selected in step S206 to the area designated in step S202, by using the distributor terminal 121. The information of the superimpose content allotted is transmitted to the content distribution server 111.

In step S208, the storage 114 stores therein the allotment information having been transmitted in step S207.

In step S209, the distributor performs video-shooting for the live content using the distributor terminal 121. The distributor terminal 121 transmits the video of the live content captured to the content distribution server 111.

In step S210, the controller 113 extracts a difference between the video image of the shooting site in the initial state, which has been transmitted in step S201, and the video image of the live content. With this, the distributor him/herself and the cup 205 are extracted from the video image of the live content.

In step S211, the controller 113 generates distribution content (corresponding to FIG. 7) in which the superimpose content is superimposed to the live content having been transmitted in step S209, according to the display area information and the allotment information stored in the storage 114.

The designator 115 determines an area to display the superimpose content in the video image of the live content, based on the display area information. The selector 116 allots the superimpose content to the designated area, based on the allotment information. In FIG. 7, a video image of a landscape such as a tree and the moon is allotted to the designated area D 244 shown in FIG. 6. The controller 113 superimposes the distributor and the cup 205 extracted in step S210 to the video image. As a result, the distributor is displayed over the video image of the landscape.

In step S212, the communicator 112 distributes the distribution content generated to the viewer terminal 131a.

In step S213, the viewer terminal 131a displays the distribution content distributed in step S110. Thus, the viewer terminal 131a is able to display the live content in which the superimpose content is superimposed to the video image thereof.

Description of Effects

As described above, the content distribution system 2 of the second embodiment of the present disclosure enables superimposition and playback of any superimpose content to any live content to be distributed by the distributor. This enables the background of the shooting site to be changed to any background without a need for a special environment such as the one using chroma key. Thus, for example, when the room for shooting a video image to be distributed as the live content is messy, it is possible to hide the messy state of the room by displaying the video image of the superimpose content as the other content in the background or the like of the distributor. As this other content displaying the background and the like, an advertisement and the like may be displayed. As a consideration of displaying the advertisement, an advertisement revenue may be earned.

Further, the superimpose content displayed in each designated area may be switched according to the distribution time of the live content. Further, the superimpose content displayed in each designated area may be switched by distributor operation on the distributor terminal 121. Further, the superimpose content may be different sets of content depending on the terminal devices.

Third Embodiment

The following describes a third embodiment of the present disclosure, which is a content distribution system 1 that recognizes an AR marker in live content, and superimposes and plays another content in the set of live content. The content distribution system 1 of the first embodiment is used to describe the third embodiment.

Video Image of Content

Figure 10:
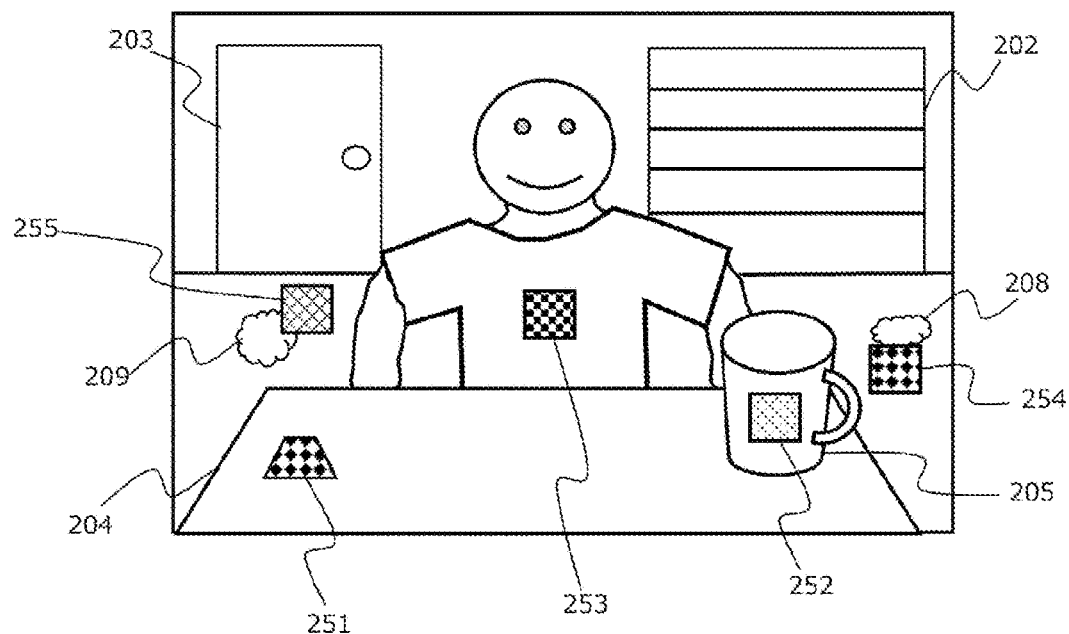
FIG. 10 is a diagram showing a video image of a shooting site of live content of a third embodiment.
Figure 11:
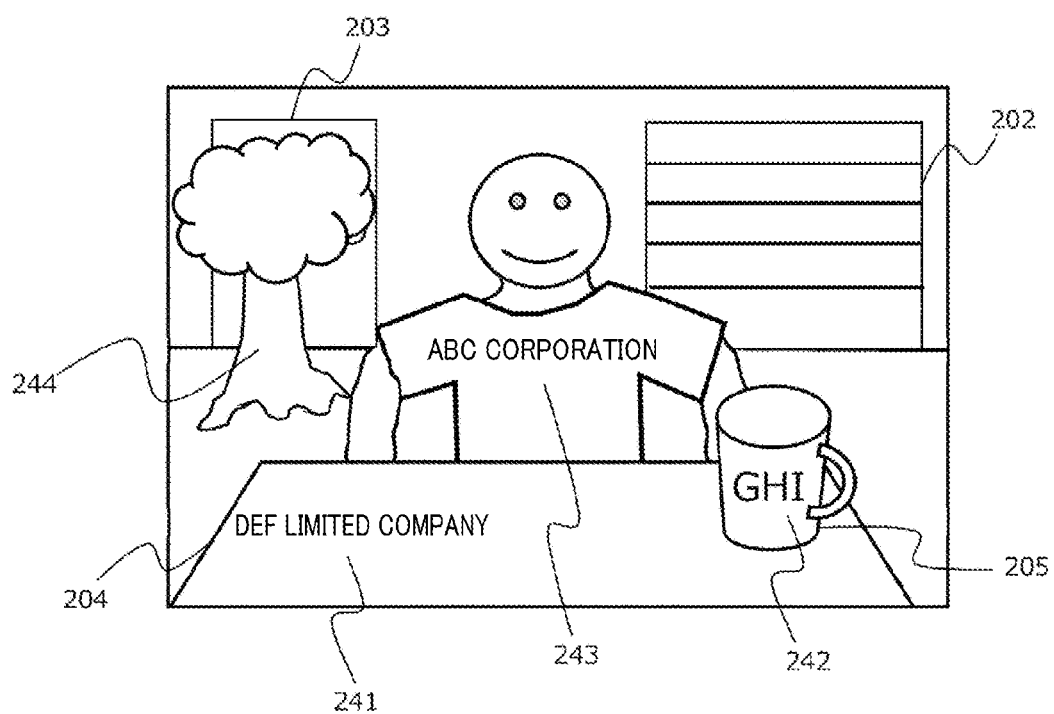
FIG. 11 is a diagram showing a distributed video image of the live content of the third embodiment.

With reference to FIGS. 10 to 11, the following describes a video image of a shooting site of live content transmitted from the distributor terminal 121 and a video image of distribution content distributed from the content distribution server 111, in relation to the third embodiment of the present disclosure.

FIG. 10 is a diagram showing a video image of a shooting site of the live content. The shooting site is a room, a living room, or the like of the home of the distributor. The room 201 includes furniture 202, a door 203, and a desk 204. Further, a cup 205 is placed on the desk. Further, pieces of rubbish 208, 209 are scattered on the floor of the room 201. The distributor is sitting in front of the desk.

FIG. 10 further shows five AR markers (Augmented Reality Markers). The AR markers are each a unique pattern serving as a marker for designating a position where another content is to be displayed, and is configured in the form of a two-dimensional code, for example. An AR marker a 251 is pasted on the top surface of the desk. An AR marker b 252 is pasted on the surface of the cup 205. An AR marker c 253 is printed on the chest part of a T-shirt the distributor wears. Further, the AR marker d 254 and the AR marker e 255 are pasted on stands (not shown) which are placed in front of pieces of rubbish 208 and 209, respectively.

The distributor is able to allot the superimpose content to each of the AR markers in the video image, while watching the video image captured by the web camera on the distributor terminal 121. In the example of FIG. 10, the distributor allots text reading "ABC Corporation," which is the superimpose content of an advertisement, to the AR marker c 253. This way, the text of "ABC Corporation" is displayed on the T-shirt having the AR marker c 253 printed thereon in the distributed video image, as shown in FIG. 11. Further, a video of "a board" of the same color as the floor can be allotted to the AR marker d 254 shown in FIG. 10. To the AR marker e 255, video content of "a tree" can be allotted. As shown in FIG. 11, in the distributed video image, the video content of "the board" is displayed in the place where the AR marker d 254 is arranged. Further, in the place where the AR marker e 255 is arranged, the video content of "the tree" is displayed. Thus, pieces of nebbish 208 and 209 scattered in the room 201 can be hidden in the distributed video image.

Process Flow

Figure 12:
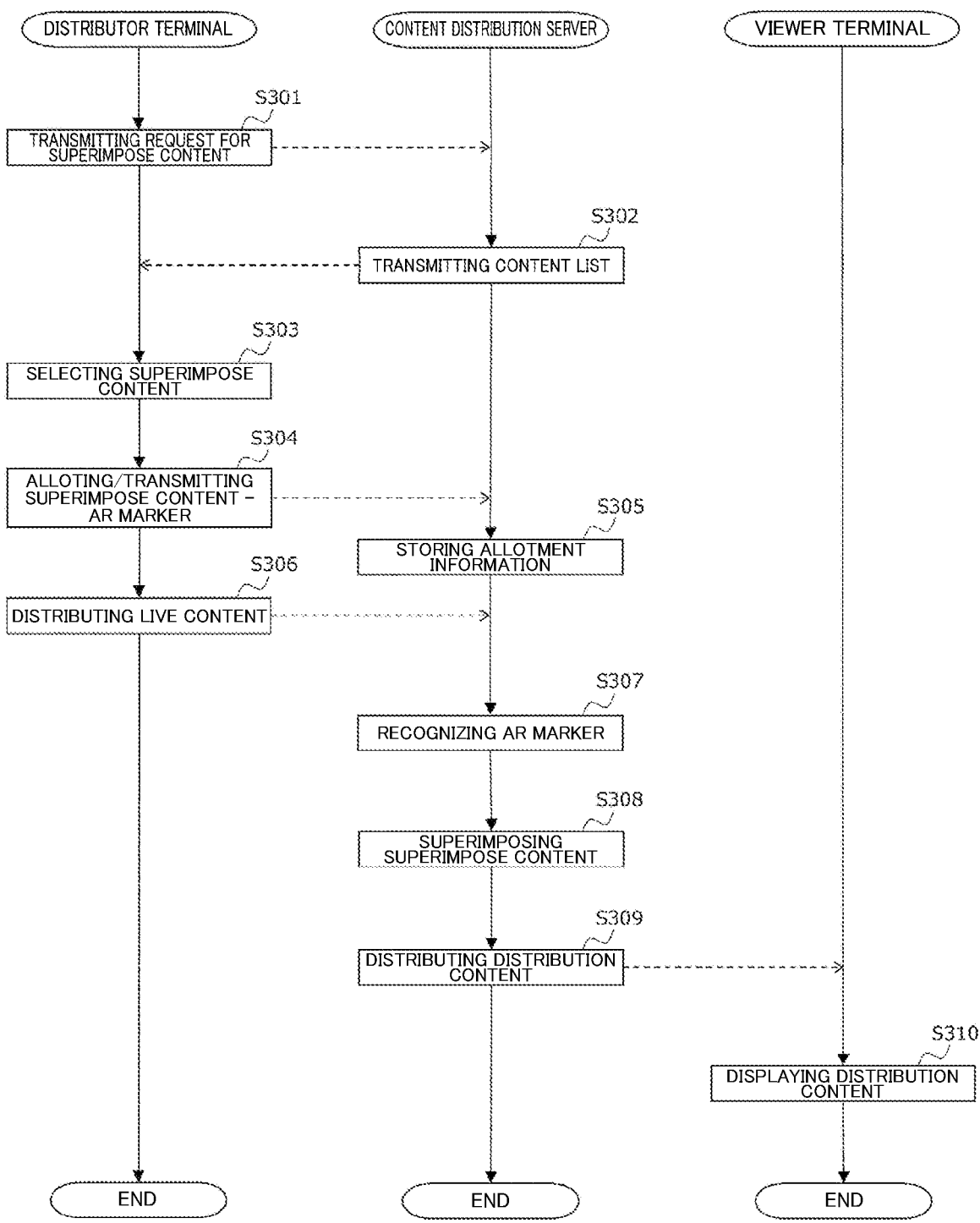
FIG. 12 is a flowchart explaining an operation of the content distribution system 1 of the third embodiment.

Next, with reference to the flowchart of FIG. 12, the following describes, operation of the content distribution system 1 of the third embodiment of the present disclosure. The flowchart of FIG. 12 shows how operations of the content distribution server 111, the distributor terminal 121, and the viewer terminal 131a are related to one another.

In step S301, the distributor transmits a request signal for distributable superimpose content, from the distributor terminal 121 to the content distribution server 111.

In step S302, the content distribution server 111 transmits the distributable superimpose content list to the distributor terminal 121, based on the request signal having been transmitted in step S301. The superimpose content list may be one that is stored in the storage 114 or one that is stored in the advertisement content server 141 and transmitted through the content distribution server.

In step S303, the distributor selects which superimpose content he/she wishes to distribute from the superimpose content list having been transmitted in step S302, by using the distributor terminal 121.

In step S304, the distributor allots the superimpose content selected in step S303 to each of the AR markers, by using the distributor terminal 121. Namely, the image of each AR marker is captured, and the captured image and the superimpose content are registered in association with each other. The information of the superimpose content allotted is transmitted to the content distribution server 111.

In step S305, the storage 114 stores therein the allotment information having been transmitted in step S304.

In step S306, the distributor performs video-shooting for the live content using the distributor terminal 121. The distributor terminal 121 transmits the video of the live content captured to the content distribution server 111.

In step S307, the designator 115 recognizes the AR markers displayed in the live content having been transmitted from the distributor terminal 121. Then, the designator 115 recognizes the position where each AR marker recognized is displayed and generates the display area information.

In step S308, the controller 113 generates distribution content in which the superimpose content is superimposed to the live content having been transmitted in step S306, according to the display area information and the allotment information stored in the storage 114.

The designator 115 determines an area to display the superimpose content in the video image of the live content, based on the display area information. For example, since the designator 115 recognizes the AR marker b 252 pasted on the surface of the cup 205, the selector 116 allots the superimpose content to the AR marker, based on the allotment information. Further, for example, the selector 116 allots another superimpose content of text reading "GHI" to the AR marker b 252. This way, the text of "GHI" is displayed on the cup 205. When the cup 205 moves, the AR marker b 252 also moves. Therefore, the superimpose content of the text reading "GHI" allotted to the AR marker b 252 also moves along with the cup 205.

In step S309, the communicator 112 distributes the distribution content generated to the viewer terminal 131a.

In step S310, the viewer terminal 131a displays the distribution content distributed in the step S310. Thus, the viewer terminal 131a is able to display the live content in which the superimpose content is superimposed to the video image thereof.

Description of Effects

As described above, the content distribution system 1 of the third embodiment of the present disclosure enables superimposition and playback of any content to a position of an AR marker in the live content to be distributed by the distributor.

Further, the superimpose content displayed in each designated area may be switched according to the distribution time of the live content. Further, the superimpose content displayed in each designated area may be switched by distributor operation on the distributor terminal 121. Further, the superimpose content may be different sets of content depending on the terminal devices.

Fourth Embodiment

The following describes a fourth embodiment of the present disclosure, which is a content distribution system 1 that superimposes and plays another content in the form of sound to the live content. The content distribution system 1 of the first embodiment is used to describe the fourth embodiment.

Figure 13:
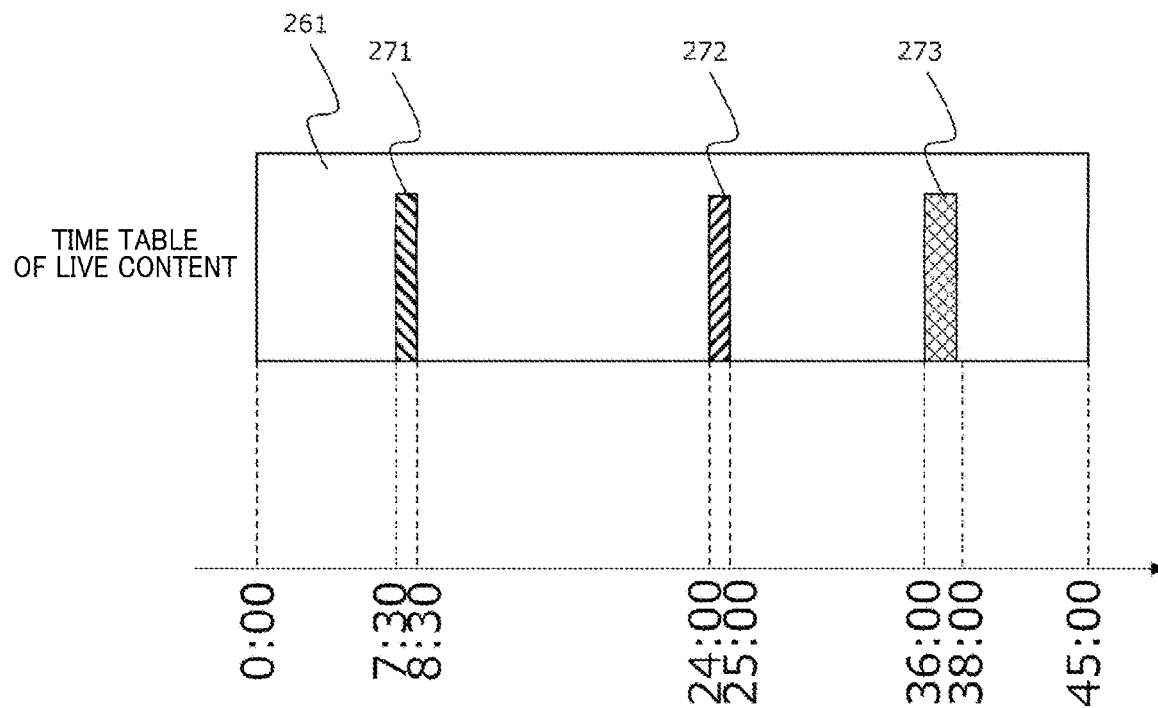
FIG. 13 is a conceptual scheme showing a timetable of the live content of a fourth embodiment.

FIG. 13 is a conceptual scheme showing a timetable regarding allotment of distribution time of live content 261. In the timetable of FIG. 13, the time elapses from the left to the right of the page of the figure. The live content 261 shown in FIG. 13 is distributed content that lasts 45 minutes, and the content distribution server 111 superimposes and plays sound content three times during the distribution.

The distributor is able to designate, on the distributor terminal 121, a period for playing the sound content as a time range. In FIG. 13, the sound content is played in designated time ranges including a designated period D 271, a designated period E 272, and a designated period F 273. The designated period D 271 is a time range from 7 minutes and 30 seconds to 8 minutes and 30 seconds within a live content distribution time. Similarly, the designated period E 272 is a time range from 24 minutes 00 second to 25 minutes and 00 second within the live content distribution time. Further, the designated period F 273 is a time range from 36 minutes and 00 second to 38 minutes and 00 second within the live content distribution time. The designator 115 stores each designated period in the storage 114 as the time range information (corresponding to the display area information of the first embodiment).

The distributor is able to select, from a content list, the sound content to be played in each designated area which is designated as a time range and allot the sound content to the designated area. The content distribution server 111 transmits a content list to the distributor terminal 121 in response to a request signal from the distributor terminal 121. The content list is a list of sound content stored in the storage 114 or the advertisement content server 141. The sound content is an advertisement sound, a stamping sound, a chime, a correct-answer sound, and the like. The distributor is able to allot the sound content selected from the content list to the designated period which is the designated time range, by using the distributor terminal 121. For example, as shown in FIG. 13, the distributor may allot the advertisement sound for a product of a company-X to the designated period F 273. For each designated area, the selector 116 stores, in the storage 114, the allotment information indicative of which advertisement content is allotted.

The distributor transmits the live content from the distributor terminal 121 to the content distribution server 111. The controller 113 generates distribution content by superimposing the sound content on the live content, based on the time range information and the allotment information. The communicator 112 distributes the distribution content generated to the viewer terminal 131a.

The viewer terminal 131a displays the distribution content distributed. Thus, the viewer terminal 131a is able to display the live content in which the sound content is added to the video thereof.

Description of Effects

As described above, the content distribution system 1 of the fourth embodiment of the present disclosure enables superimposition and playback of any sound content to any live content to be distributed by the distributor.

This sound content played in the designated area may be switched by distributor operation of the distributor terminal 121. The distributor may set, as the allotment information, the sound content to be switched in advance from the distributor terminal 121.

Further, the sound content may be different sets of content depending on the terminal devices. For example, as the sound content to be played at the designated period F 273, the distributor may allot the advertisement sound for a product of a company-X, for the terminal device 131a, and allot an advertisement sound for a service of a company-Y for the terminal device 131b. The controller 113 is capable of analyzing preferences of viewers based on their login ID information through their terminal devices. The controller 113 generates sets of distribution content, each of which has a set of sound content superimposed according to the preference of each viewer. The communicator 112 then transmits these sets of distribution content thus generated to the viewer terminals 131a, 131b respectively. It should be noted that the controller 113 may analyze the preference of each viewer based on cookie information (HTTP cookie) from the viewer terminal, instead of using the login information.

Program

Figure 14:
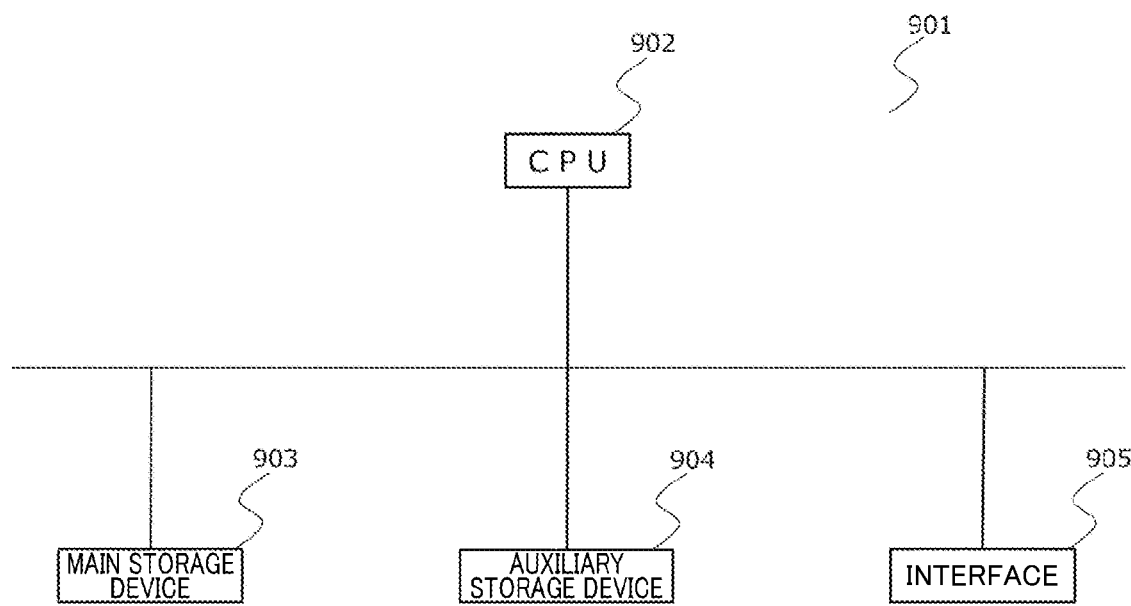
FIG. 14 is a schematic block diagram showing a configuration of a computer of the embodiment.

FIG. 14 is a schematic block diagram showing a configuration of a computer 901. The computer 901 includes a CPU 902, a main storage device 903, an auxiliary storage device 904, and an interface 905.

The following details a program that achieves functions constituting the content distribution server 111 of the embodiments of the present disclosure.

The content distribution server 111 is implemented in the computer 901. The operations of elements constituting the content distribution server 111 are stored in the auxiliary storage device 904, in the form of a program. The CPU 902 reads out the program from the auxiliary storage device 904, loads the program into the main storage device 903 to execute the above-described process according to the program. Further, the CPU 902 reserves a storage area corresponding to the above-described storage in the main storage device 903 according to the program.

The program is specifically a content distribution program that implements in the computer 901 the steps of: receiving live contents transmitted through a network from a distributor terminal used by a distributor of a live content; designating an area in the live content, where another content is superimposed and played; selecting the other content to be played in the area designated; generating a distribution content by superimposing the other content selected in the area designated in the live content; and distributing the distribution content to a viewer terminal through a network.

It should be noted that the auxiliary storage device 904 is an example of a non-transitory tangible medium. Other examples of such a non-transitory tangible medium include a magnetic disk, a magneto-optical disk, a CD-ROM, a DVD-ROM, a semiconductor memory, and the like which are connected through an interface 905. In cases where the program is delivered to the computer 901 through a network, the computer 901 that has received the program may load the program into the main storage device 903 and execute the above-described process.

Further, the program may achieve a part of the above-described functions. Further, the program may be a so-called differential file (differential program) that achieves the above-described functions in combination with another program already stored in the auxiliary storage device 904.

These embodiments can be implemented in various other forms, and various omissions, substitutions and changes can be made without departing from the spirit and scope of the invention. The embodiments and variations thereof are included within the scope and spirit of the invention as defined in the appended claims.

DESCRIPTION OF REFERENCE CHARACTERS

1 Content Distribution System
111 Content Distribution Server
112 Communicator
113 Controller
114 Storage
115 Designator
116 Selector
121 Distributor Terminal
131a, 131b Viewer Terminal
141 Advertisement Content Server
201 Room
202 Furniture
203 Door
204 Desk
205 Cup
208, 209 Rubbish
231 Face-Caught Area
241 Designated Area A
242 Designated Area B
243 Designated Area C
244 Designated Area D
251 AR Marker a
252 AR Marker b
253 AR Marker c
254 AR Marker d
255 AR Marker e
261 Live Content
271 Designated Period D
272 Designated Period E
273 Designated Period F
901 Computer
902 CPU
903 Main Storage Device
904 Auxiliary Storage Device
905 Interface

The invention claimed is:

1. A server comprising a processor configured to:
receive a live content from a first terminal of a distributor through a network, the live content created by the distributor;
generate an area within a video image of the live content, the area designated by the distributor of the live content;
select another content responsive to an operation by the server, a second terminal, or a third terminal, the another content provided by the second terminal; and
generate a distribution content by superimposing the another content on the area in the live content; and
distribute the distribution content to the third terminal through the network.

2. The server of claim 1, wherein the processor is configured to generate the area within the video image of the live content responsive to an operation of the first terminal.

3. The server of claim 1, wherein the processor is configured to select the another content responsive to the operation by the server.

4. The server of claim 1, wherein the processor is configured to select the another content responsive to the operation by the second terminal.

5. The server of claim 1, wherein the processor is configured to select the another content responsive to the operation by the third terminal.

6. A method, comprising:
receiving a live content from a first terminal of a distributor through a network, the live content created by the distributor;
generating an area within a video image of the live content, the area designated by the distributor of the live content;

selecting another content responsive to an operation by a server, a second terminal, or a third terminal, the another content provided by the second terminal;

generating a distribution content by superimposing the another content on the area in the live content; and distributing the distribution content to the third terminal through the network.

7. The method of claim 6, wherein generating the area includes generating the area responsive to an operation provided by the first terminal.

8. The method of claim 6, wherein the operation is provided by the server.

9. The method of claim 6, wherein the operation is provided by the second terminal.

10. The method of claim 6, wherein the operation is provided by the third terminal.

11. A non-transitory computer-readable medium storing a program which, when executed, causes a computer to execute functions comprising:

receiving a live content from a first terminal of a distributor through a network, the live content created by the distributor;

generating an area within a video image of the live content, the area designated by the distributor of the live content;

selecting another content responsive to an operation by the computer, a second terminal, or a third terminal, the another content provided by the second terminal;

generating a distribution content by superimposing the another content on the area in the live content; and distributing the distribution content to the third terminal through the network.

12. The non-transitory computer-readable medium of claim 11, wherein generating the area includes generating the area responsive to an operation provided by the first terminal.

13. The non-transitory computer-readable medium of claim 11, wherein the operation is provided by the computer.

14. The non-transitory computer-readable medium of claim 11, wherein the operation is provided by the second terminal.

15. The non-transitory computer-readable medium of claim 11, wherein the operation is provided by the third terminal.

* * * * *